Oct. 17, 1950     J. E. GROGAN     2,526,350
GRINDING MACHINE
Filed Nov. 20, 1948     2 Sheets-Sheet 1
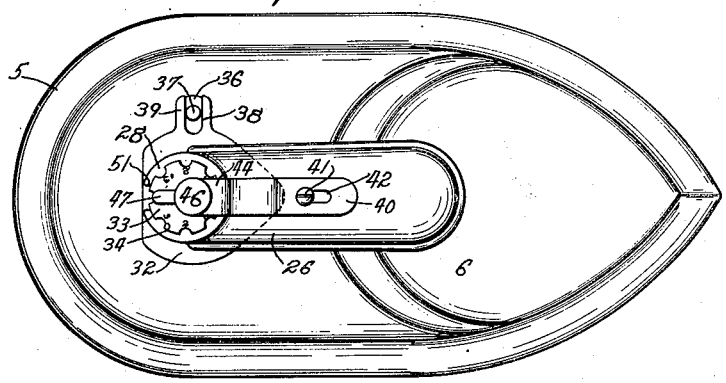
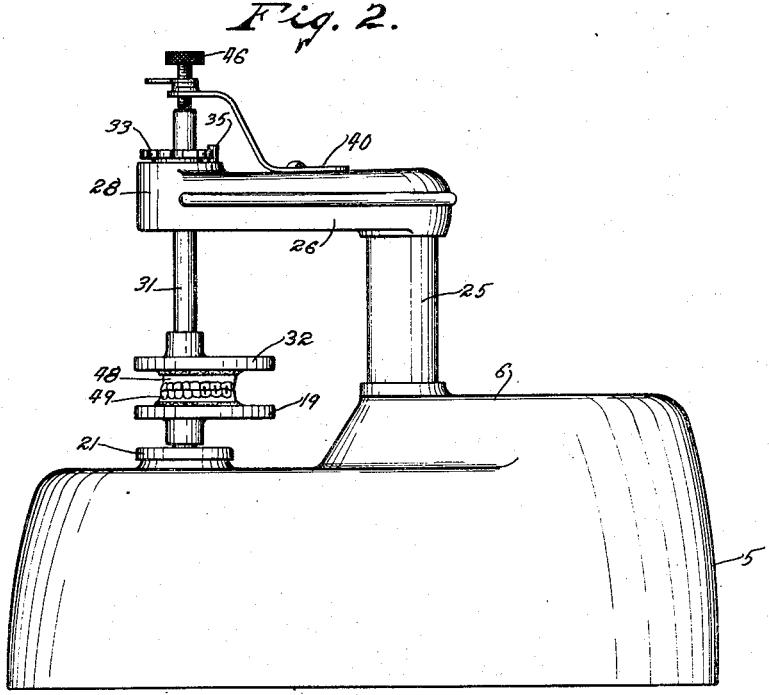
INVENTOR.
JOHN E. GROGAN
BY
*Louis V. Lucia*
ATTORNEY Oct. 17, 1950 J. E. GROGAN 2,526,350
GRINDING MACHINE
Filed Nov. 20, 1948 2 Sheets-Sheet 2
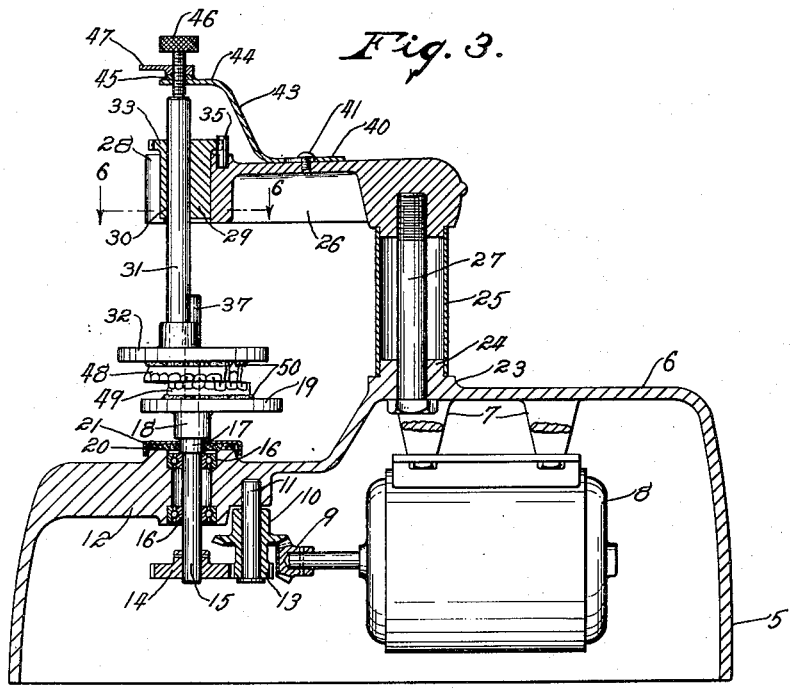
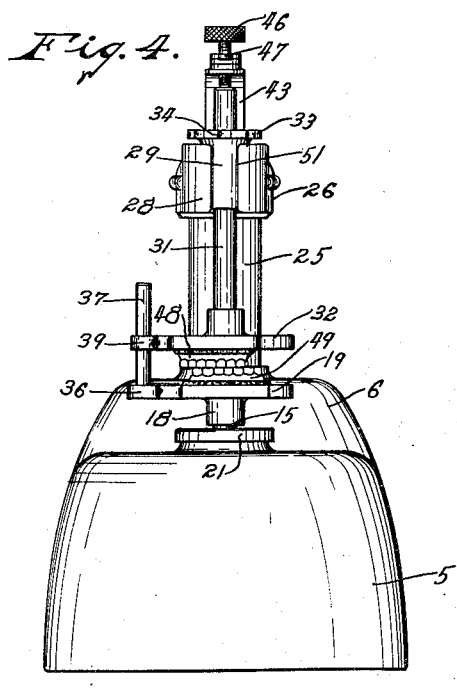
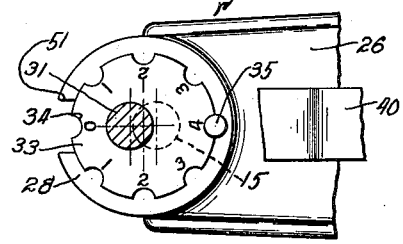
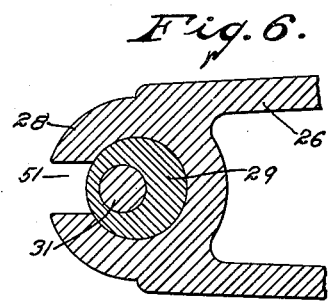
INVENTOR.
JOHN E. GROGAN
BY
Louis V. Lucia
ATTORNEY Patented Oct. 17, 1950

2,526,350

UNITED STATES PATENT OFFICE 2,526,350

GRINDING MACHINE

John E. Grogan, West Hartford, Conn.

Application November 20, 1948, Serial No. 61,220

8 Claims. (Cl. 32—58)

This invention relates to grinding machines and more particularly to such devices as are adapted to grind the teeth of dental plates and the like.

An object of this invention is to provide a dental plate grinding machine in which the amount of grinding on the teeth of said dental plates can be selectively controlled.

A further object of the invention is to provide such a grinding machine in which the pressure on the teeth of the upper and lower dental plates may be regulated during the grinding operation in order to obtain the best results.

A still further object of this invention is to provide a dental plate grinding machine which is simple in its construction, easy to operate, and adapted to receive various sizes of dental plates.

Further objects and advantages of this invention will be more clearly understood from the following description and from the accompanying drawings in which:

Fig. 1 is a plan view of a dental plate grinding machine embodying my invention.

Fig. 2 is a side view thereof showing the holding plates in concentric position and a set of dental plates therebetween.

Fig. 3 is a side view, partially in central vertical section, illustrating the construction of my improved machine and the mounting plates in the full eccentric position.

Fig. 4 is a front view thereof.

Fig. 5 is a fragmentary plan view, partly in section, illustrating the eccentricity control of my improved machine.

Fig. 6 is a fragmentary sectional view thereof on line 6—6 of Fig. 3.

In the embodiment of the invention as illustrated in the drawings, my novel dental plate grinding machine preferably comprises a hollow base 5 having a raised portion 6 which is provided on the underside thereof with depending bosses 7 to which is attached an electric motor 8. The said motor has secured to the drive shaft thereof a bevel driving gear 9 which meshes with an idler bevel gear 10 mounted for free rotation on a shaft 11 which is mounted on a boss 12 depending from the underside of the hollow casing 5. The idler gear 10 has formed integrally therewith a spur gear 13 which meshes with a spur gear 14 that is pinned to a shaft 15 rotatably mounted in ball-bearings 16—16 positioned in an opening extending through the said boss 12 and centrally located between the sides of the base 5.

The said shaft 15 has an enlarged portion 17 thereon forming a shoulder which rests on the inner race of the uppermost bearing 16 for supporting the said shaft thereon. To the said portion 17, there is suitably secured, by means of a boss 18, a lower supporting plate 19 which rotates with the shaft 15 that is driven by the said electric motor through the above mentioned gear train. A felt pad 20 and a dust cap 21 are provided around the portion 17 for preventing the entrance of any foreign matter into the said bearings.

A boss 23, having a reduced positioning projection 24 thereon, is provided at the front of the raised portion 6 and is positioned on the longitudinal axis of the base 5 in line with the center line of the shaft 15. A spacing tube 25 is supported on said boss 23 and has an arm 26 at the top thereof which is retained thereon by means of a bolt 27, as clearly shown in Fig. 3. The said arm 26 is provided with a portion 28 at the front end thereof in which is slidably and rotatably mounted a bushing 29 having a longitudinal eccentrically located hole 30 therethrough in which is rotatably mounted a shaft 31 which has secured to the lower end thereof, an upper supporting plate 32 of substantially the same shape as the lower supporting plate 19.

The said bushing 29 is provided with a flange 33 at the top thereof having a plurality of notches 34 engageable by a pin 35 securely fastened in the top of the portion 28 as shown in Figs. 3 and 5. The said flange has indicia on the top surface thereof and adjacent each of the notches 34 to indicate the various positions of the bushing for obtaining different amounts of eccentricity between the shaft 31 and the shaft 15. It will be noted that, when the notch marked zero is engaged by the pin 35, the shafts 31 and 15 will be disposed upon a common axis.

In order to impart the rotation of the bottom plate 19 to the upper plate 32, a projection 36 is provided on the said bottom plate and has extending vertically therefrom, an elongated pin 37 which passes through a notch 38 in a similar projection 39 extending from the edge of the upper plate 32; the said pin being movable longitudinally and transversally of said notch to permit relative adjustments of the supporting plates and eccentric movement therebetween.

My novel dental plate grinding machine may also include means for applying various amounts of pressure between the upper and lower supporting plates, which means may comprise a spring 40 which is attached to the top of the arm 26 by a screw 41 and provided with a slot 42 therein to permit the spring to be moved lengthwise on said arm to release the shaft 31 when it is desired to raise the plate 32 to permit inspection of the dental plates. The said spring has an upwardly inclined portion 43 and a horizontal portion 44 which has fastened thereto a nut 45 in which is threaded a cap screw 46 that engages the top of the shaft 31. The said spring tends to urge the screw 46 downwardly against the shaft 31 and the amount of downward thrust imparted to the said shaft by the spring may be regulated by turning the screw 46 in the required direction. The said screw may be locked in position by means of a lock nut 47.

In the use of this device, when it is desired to grind the teeth of upper and lower denture plates, the said plates are fastened to the upper and lower supporting plates 32 and 19 as clearly shown in Fig. 3 wherein the upper dental plate 48 is fastened to the upper supporting plate 32 and the lower plate 49 is fastened to the lower supporting plate 19 by any suitable means, such as cement 50 or the like.

The amount of eccentricity which is desired between the supporting plates 19 and 32 may then be adjusted by sliding the bushing 29 upwardly in the bushing support 28 and rotating it therein until one of the notches 34 is aligned with the pin 35. The bushing is then dropped downwardly so that the said pin is engaged in the selected notch 34 and in a position similar to that shown in Figs. 3 and 5, wherein the bushing is locked in position for the greatest amount of eccentricity.

A suitable grinding compound may then be placed between the teeth of the dental plates 48 and 49, the desired amount of pressure is applied between the said teeth by means of the adjustment screw 46 and the machine started in operation. The bottom plate 19 is then caused to rotate and the rotation of this plate is transferred, by means of the pin 37, to the upper plate 32 which rotates with the plate 19 but eccentrically with respect thereto to cause a grinding action between the teeth of upper and lower denture plates 48 and 49. The eccentric movement of the upper plate 32 is accommodated by the lateral movement permitted between the pin 37 and notch 38 as will readily be understood.

A slot 51 is preferably provided in the front of the bearing portion 28 so that, when it is desired to remove the shaft 31 from the machine for either mounting a dental plate thereon, or removing one therefrom, the screw 46 may be moved away from the end of the shaft and the bushing 29 lifted upwardly until it is also removed from the shaft 31. The shaft may then be passed through the slot 51 and removed from the machine.

I claim:

1. A dental plate grinding machine of the character described comprising a base, a lower vertical shaft rotatable in said base, a supporting plate carried by said lower shaft, a supporting arm on said base, an eccentric bushing rotatably adjustable on said arm, supporting an upper vertical shaft rotatable in said bushing, a supporting plate on said upper vertical shaft, means for rotating one of said plates, and means connecting said plates for combined rotation and permitting relative eccentric movement therebetween.

2. A dental grinding machine of the character described comprising a base, a lower vertical shaft rotatable in said base, a supporting arm spaced above said base, an eccentric bushing rotatably adjustable on said arm, an upper vertical shaft rotatable and slidable in said bushing, a supporting plate mounted upon the adjacent ends of each of said shafts and having opposed surfaces adapted to receive a pair of dental plates to be ground in said machine, means for rotating said lower supporting plate, and a connection between said supporting plates permitting relative eccentric movement therebetween.

3. A dental grinding machine of the character described comprising a base, a lower vertical shaft rotatable in said base, means for rotating said shaft, a supporting arm spaced above said base, an eccentric bushing carried on said arm, an upper vertical shaft slidable and rotatable in said eccentric bushing, a supporting plate carried upon the adjacent ends of said shafts and having opposed surfaces adapted to support a pair of dental plates therebetween, means for providing relative eccentric movement between said plates upon rotation of said shafts, means for adjusting the degree of said eccentric movement including a flange on said bushing having a series of notches therein, a locating pin on said supporting arm receivable in said notches for retaining the bushing in different positions to thereby eccentrically vary the position of the upper shaft with relation to the lower shaft, and a connection between said upper and lower supporting plates permitting the said eccentric movement.

4. A dental plate grinding machine of the character described comprising a base, a lower shaft rotatable in said base on a vertical axis, a supporting arm spaced above said base, a bushing rotatably carried in said arm on an axis spaced from and parallel to the axis of the lower shaft, the said bushing having an opening extending longitudinally therethrough on an eccentrically disposed axis, an upper shaft rotatable and slidable in said opening, a supporting plate carried upon the end of each of said lower and upper shafts for providing opposed surfaces for mounting a pair of dental plates to be ground in said machine, the said bushing being rotatably adjustable to locate the axis of the upper shaft on the same axis as the lower shaft and to space the axis of said shafts at different distances to vary the amount of relative eccentric movement between said supporting plates, means resiliently urging said supporting plates towards each other, means for rotating said lower shaft, and means connecting said supporting plates for combined rotation and permitting said relative eccentric movement therebetween.

5. A dental plate grinding machine comprising a base, a lower shaft rotatable in said base on a vertical axis, a supporting arm spaced from said base, an upper shaft rotatable in said supporting arm on a vertical axis, an upper and a lower supporting plate mounted respectively to the end of each of said upper and lower shafts and providing opposed mounting surfaces for a pair of dental plates, means for adjusting the position of the upper shaft with relation to the lower shaft whereby the axis of said shafts may be in line or relatively spaced at different distances, a loose connection between said supporting plates for combining the rotation of the shafts and permitting relative eccentric movement between said plates, spring means bearing upon the end of the upper shaft to yieldingly urge said upper shaft in the direction of the lower shaft for applying pressure between the said dental plates, and adjustment means for varying the tension of said spring means.

6. A dental plate grinding machine as set forth in claim 5 wherein the said loose connection comprises a vertical post carried upon one of said supporting plates, and a slot in the other supporting plate rotatably receiving said post and permitting relative eccentric movement between said plates.

7. A dental plate grinding machine of the character described comprising a base, a lower shaft rotatable in said base on a vertical axis, means within said base for rotating said lower shaft, a supporting arm mounted on said base, an aperture in said supporting arm on an axis parallel to and spaced from the axis of the lower shaft, a bushing rotatable in said aperture and having a bearing opening extending therethrough on an axis parallel to and spaced from the axis of said bushing for a distance equal to the distance between the said axis of the bushing and lower shaft, means for rotatably adjusting said bushing in said supporting arm, a vertical shaft extending through said bearing opening and being rotatable and vertically slidable therein, a supporting plate mounted on each of said lower and upper shafts and having opposed surfaces for mounting a pair of dental plates to be ground in said machine, a slot in said supporting arm communicating with the said aperture therein to permit passage of the upper shaft, a spring movably secured to the supporting arm, an adjusting screw threaded to said spring and bearing upon said upper shaft to yieldingly urge the said plates towards each other and apply adjustable pressure between said dental plates, and a connection between said supporting plates for causing combined rotation thereof and permitting relative eccentric movement.

8. A dental plate grinding machine comprising a base, a lower shaft rotatable in said base on a vertical axis, means within said base for driving said lower shaft, a post on said base, a supporting arm extending from said post, a bushing rotatable in said arm on an axis parallel to and spaced from the axis of said lower shaft, a bearing opening extending through said bushing on an axis parallel to and spaced from the axis of the bushing for a distance substantially equal to the distance from which the said axis is spaced from the axis of the lower shaft, an upper shaft rotatable and slidable in said bearing opening, a supporting plate mounted upon the end of each of said upper and lower shafts and having opposed mounting surfaces for a pair of dental plates, an annular flange on said bushing having a series of notches in the periphery thereof, a vertical pin projecting from said arm and adapted to be received in said notches for locating the bushing in different positions to thereby vary the distance between the axis of the upper and lower shafts to provide different degrees of relative eccentric movement between said supporting plates upon the rotation thereof, spring means resiliently urging said supporting plates towards each other and providing pressure between the dental plates thereon, means for adjusting said spring means for varying the said pressure, a connection between said supporting plates including a vertical post on the lower plate fitting within a laterally extending notch in the upper plate to cause combined rotation of the said supporting plates and permit said eccentric movement therebetween, the said bushing and upper shaft being removable from said machine in an upward direction and the said arm having a slot communicating with the bushing receiving opening thereinto permit passage of the upper shaft therethrough.

JOHN E. GROGAN.

REFERENCES CITED

The following references are of record in the file of this patent:

UNITED STATES PATENTS

| Number | Name | Date |
| --- | --- | --- |
| 2,097,701 | Pfeiffer | Nov. 2, 1937 |
| 2,106,125 | Roebuck et al. | Jan. 18, 1938 |